United States Patent [19]
Coe

[11] Patent Number: 4,553,262
[45] Date of Patent: Nov. 12, 1985

[54] COMMUNICATIONS SYSTEM ENABLING RADIO LINK ACCESS FOR NON-TRUNKED RADIO UNITS TO A MULTIFREQUENCY TRUNKED TWO-WAY COMMUNICATIONS SYSTEMS

[75] Inventor: Richard H. Coe, Crystal Lake, Ill.

[73] Assignee: Motorola, Inc., Schaumburg, Ill.

[21] Appl. No.: 555,102

[22] Filed: Nov. 25, 1983

[51] Int. Cl.⁴ .................. H04B 7/155; H04B 7/26; H04Q 7/02
[52] U.S. Cl. ............................. 455/15; 179/2 EB; 370/26; 455/54
[58] Field of Search .............. 455/11, 15, 17, 16, 455/7, 20, 21, 49, 53, 54; 370/26, 75; 179/2 E, 2 EB

[56] References Cited

U.S. PATENT DOCUMENTS

| | | | |
|---|---|---|---|
| 3,173,996 | 3/1965 | Rypinski, Jr. | 179/41 |
| 3,683,116 | 8/1972 | Dill | 179/15 AQ |
| 3,745,462 | 7/1973 | Trimble | 325/22 |
| 3,946,315 | 3/1976 | Tustison | 325/55 |
| 3,955,140 | 5/1976 | Stephens et al. | 325/4 |
| 4,012,597 | 3/1977 | Lynk, Jr. et al. | 179/41 A |
| 4,016,494 | 4/1977 | Moll | 455/53 |
| 4,056,779 | 11/1977 | Toler | 325/4 |
| 4,125,808 | 11/1978 | Graham | 325/55 |
| 4,144,497 | 3/1979 | Andrea, III | 455/11 |
| 4,152,647 | 5/1979 | Gladden et al. | 455/54 |
| 4,242,542 | 12/1980 | Kimbrough | 179/170 R |
| 4,284,848 | 8/1981 | Frost | 455/11 |
| 4,312,070 | 1/1982 | Coombes et al. | 371/40 |
| 4,347,625 | 8/1982 | Williams | 455/78 |
| 4,360,927 | 11/1982 | Bowen et al. | 455/78 |
| 4,399,555 | 8/1983 | MacDonald et al. | 179/2 EB |
| 4,409,687 | 10/1983 | Berti et al. | 455/7 |

OTHER PUBLICATIONS

"Ptarmigan Radio Relay—Its Roles and Characteristics"—Jenks et al., Communications 78: Conference on Communications Eqpmnt. and Systems, Birmingham, England, Apr. 4–7, 1978, pp. 329–331.

*Primary Examiner*—Marc E. Bookbinder
*Attorney, Agent, or Firm*—James E. Jacobson, Jr.; Edward M. Roney; James W. Gillman

[57] ABSTRACT

An improved multifrequency trunked, two-way communications system is provided in which a plurality of conventional single channel radio units are provided access. The system includes a predetermined number of information channels that are shared by a plurality of trunked stations. A trunked controller assigns one of the information channels to a requesting trunked mobile unit. The requesting trunked mobile unit is enabled to operate on the assigned channel in response thereto.

The improved communications system includes a radio access link which enables the single channel radio units to operate on an assigned information channel in the same manner as the trunked remote stations. The radio access link provides the plurality of conventional remote stations automatic access to the trunked system without requiring any modification of the conventional remote stations, and likewise without modification of the trunked remote stations and trunked controller.

20 Claims, 17 Drawing Figures

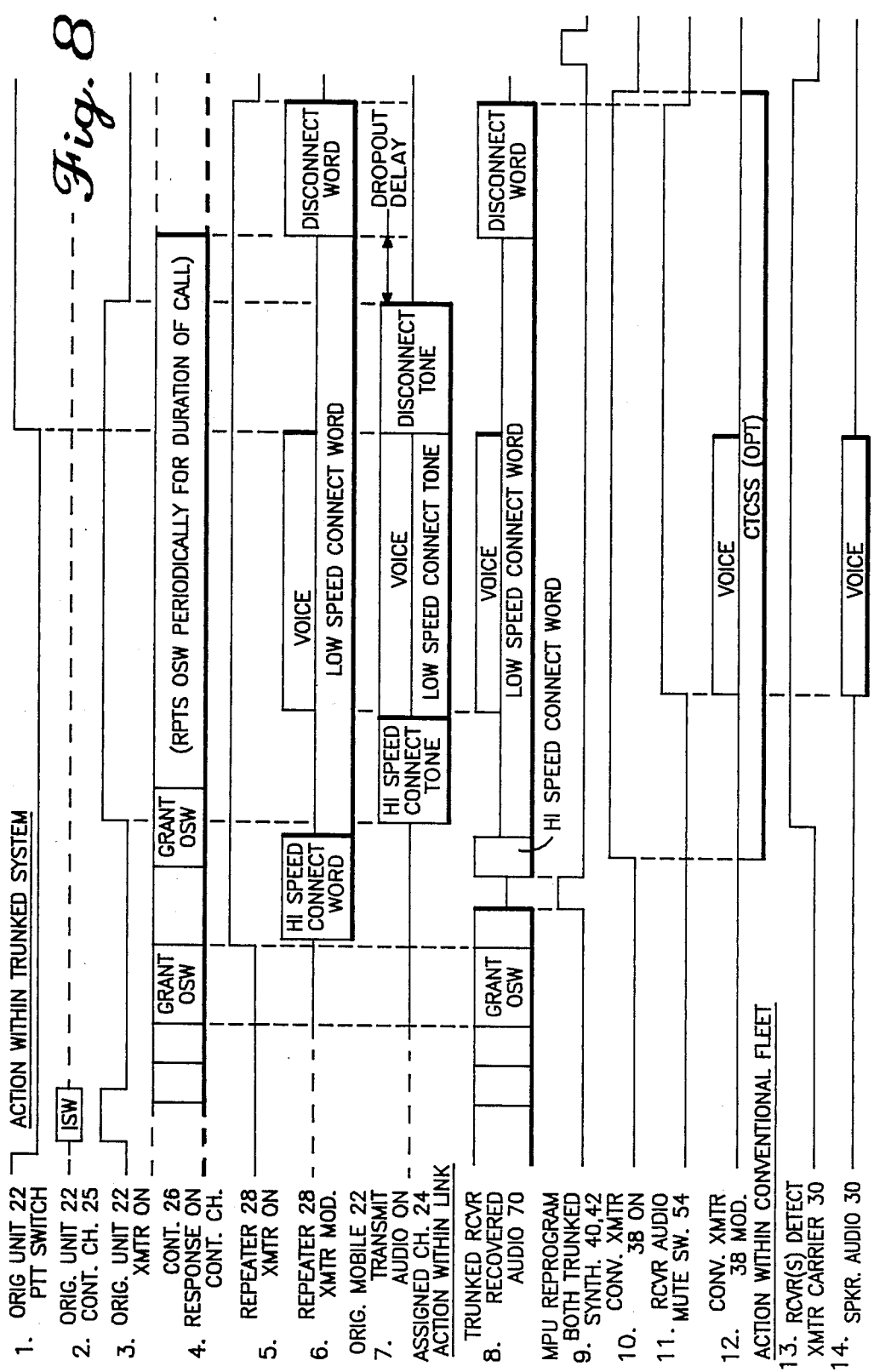

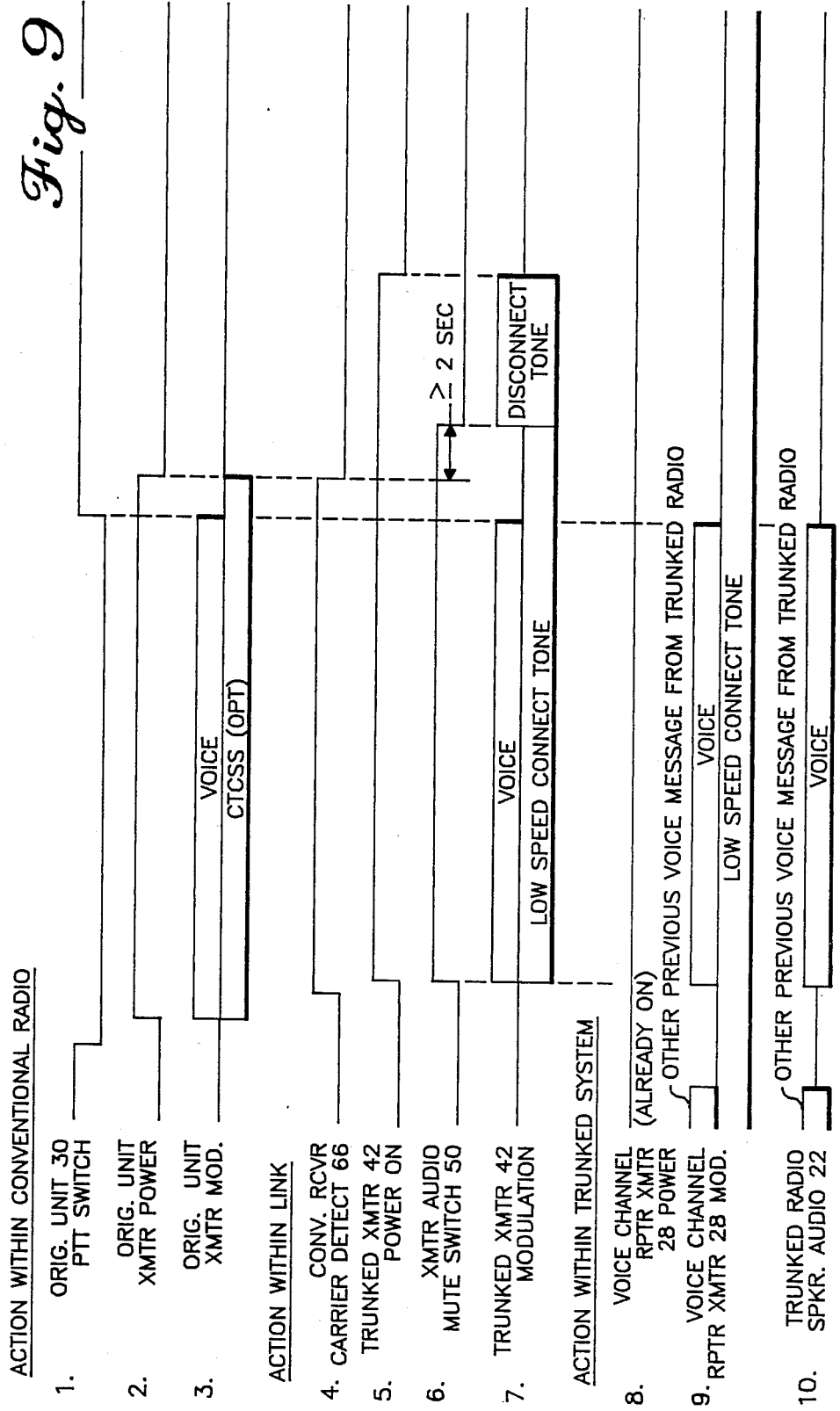

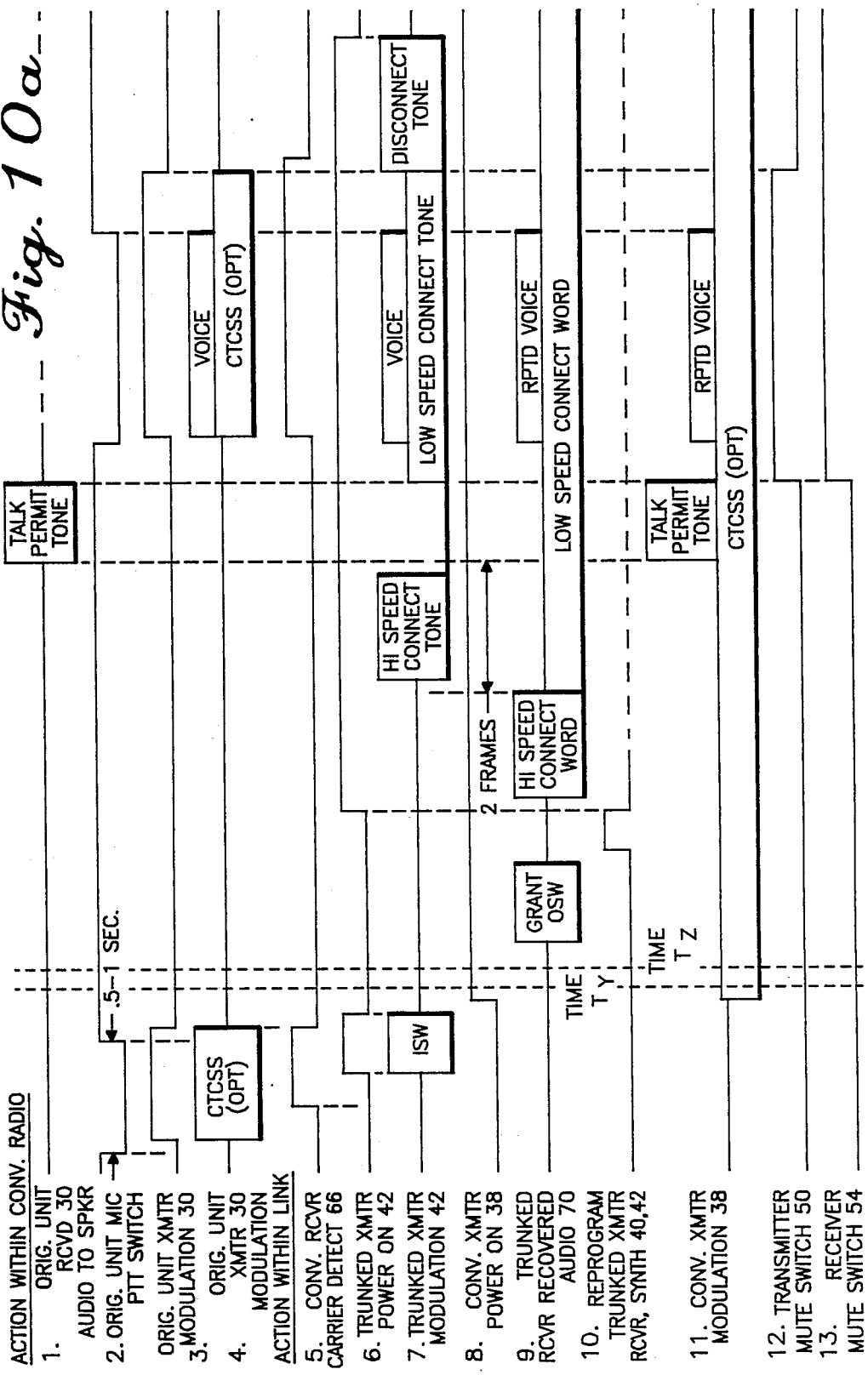

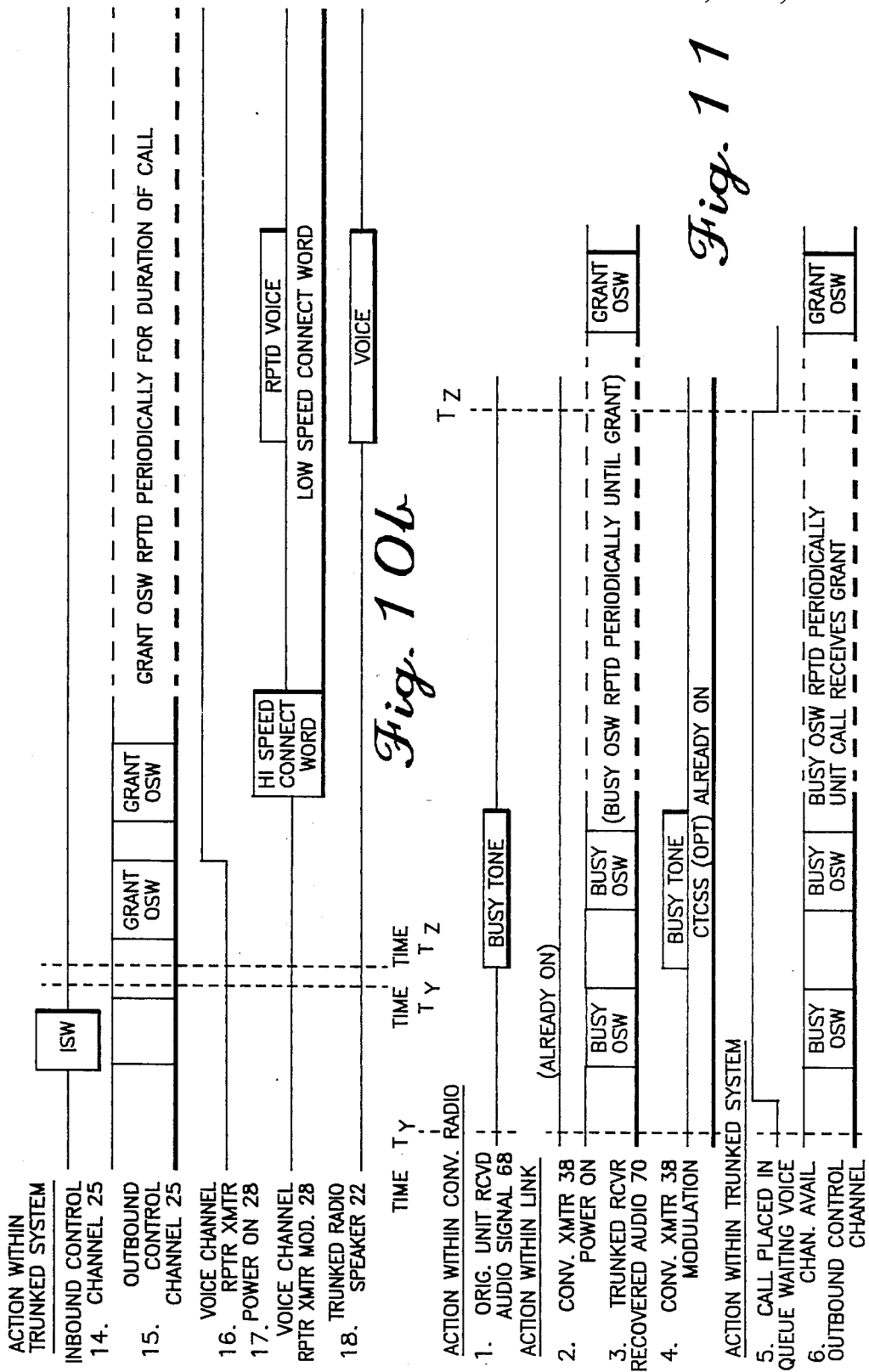

COMMUNICATIONS SYSTEM ENABLING RADIO LINK ACCESS FOR NON-TRUNKED RADIO UNITS TO A MULTIFREQUENCY TRUNKED TWO-WAY COMMUNICATIONS SYSTEMS

BACKGROUND OF THE INVENTION

This invention relates to an improved multifrequency trunked, two-way radio communications system and, more particularly, to such a system wherein access to the system may be provided to a plurality of conventional, non-trunked, single channel radio units.

Trunked communications systems are well known in both the telephone and mobile radio communications art. In such systems, a plurality of subscribers share a predetermined number of transmission channels. The channels are assigned to subscribers by a trunked controller that can be implemented by a central control station or distributed control logic. The trunked controller truncates the channel assignment on the conclusion of an entire interchange message for message trunking or on the conclusion of a transmission for a transmission trunking. A transmission trunked communications system is described in U.S. Pat. No. 4,012,597 issued Nov. 24, 1975 to Lynk, Jr., et al., which is assigned to the same assignee as the present invention.

In a trunked communications system, each of the plurality of trunked mobile stations is specially equipped with control circuitry to enable requesting and receiving a channel assignment and to enable operating on the channel assigned by the trunked controller.

Trunked communications systems provide advantages over a conventional single channel system. System congestion problems of a single channel are avoided by a multichannel system. Additionally, the identifiable trunked stations and signaling capability thereof enable communications between selected ones of the trunked stations without alerting other trunked stations. However, when establishing a multifrequency trunked, two-way radio communications system, it is often not affordable to replace all the existing conventional, single channel units being used in an existing conventional communications system. Modification of the existing conventional single channel units to operate in a trunked system likewise would not be feasible.

There exists a need for an improved multifrequency trunked, two-way radio communications system in which a plurality of conventional, single channel radio units are provided access. Such access should enable two-way communications between the conventional, single channel radio units and the trunked mobile stations. Additionally, it is highly desirable that such access be provided without requiring burdensome manual operations at the plurality of conventional stations.

SUMMARY OF THE INVENTION

Accordingly, it is an object of the present invention to provide an improved multifrequency trunked, two-way radio communications system in which a plurality of conventional, single channel radio units are provided access.

It is a further object of the present invention to provide a radio access link to provide a plurality of conventional, single channel radio units access to a multifrequency trunked, two-way radio communications system.

Briefly, in accordance with the present invention, an improved multifrequency trunked, two-way radio communications system is provided that selectively operates on any assigned one of a predetermined number of information channels wherein one or more conventional, single channel radio units are provided access to the trunked system.

The invention is directed to a method and apparatus for effecting access to, and permit operation in a multifrequency trunked, two-way radio communications system by a plurality of conventional, non-trunked, single channel radio units. The trunked system includes a trunked controller and a plurality of trunked remote stations operating on an assigned one of a plurality of information channels. The method, inter alia, includes receiving a transmission from a conventional, non-trunked, remote station, requesting a channel assignment from the trunked controller in response thereto; receiving a channel assignment signal from the trunked controller, and then permitting the requesting conventional remote station to operate on the assigned channel in the same manner as the trunked remote stations.

Apparatus is provided to enable performing the method of the invention.

DESCRIPTION OF THE DRAWINGS

FIG. 8 is an event diagram illustrating communications between trunked and conventional stations via the radio access link with a trunked station initiating the call;

FIG. 9 is an event diagram illustrating communications between trunked and conventional stations via the radio access link with a conventional station initiating the call and with a voice channel previously assigned;

FIGS. 10a and 10b are event diagram illustrating communications between trunked and conventional stations via the radio access link with a conventional station initiating a call without a prior assigned voice channel; and FIG. 11 is an event diagrams illustrating the conventional station initiating a call with all of the voice channels in use for a system busy condition.

DESCRIPTION OF THE PREFERRED EMBODIMENT OF THE INVENTION

Figure 1:
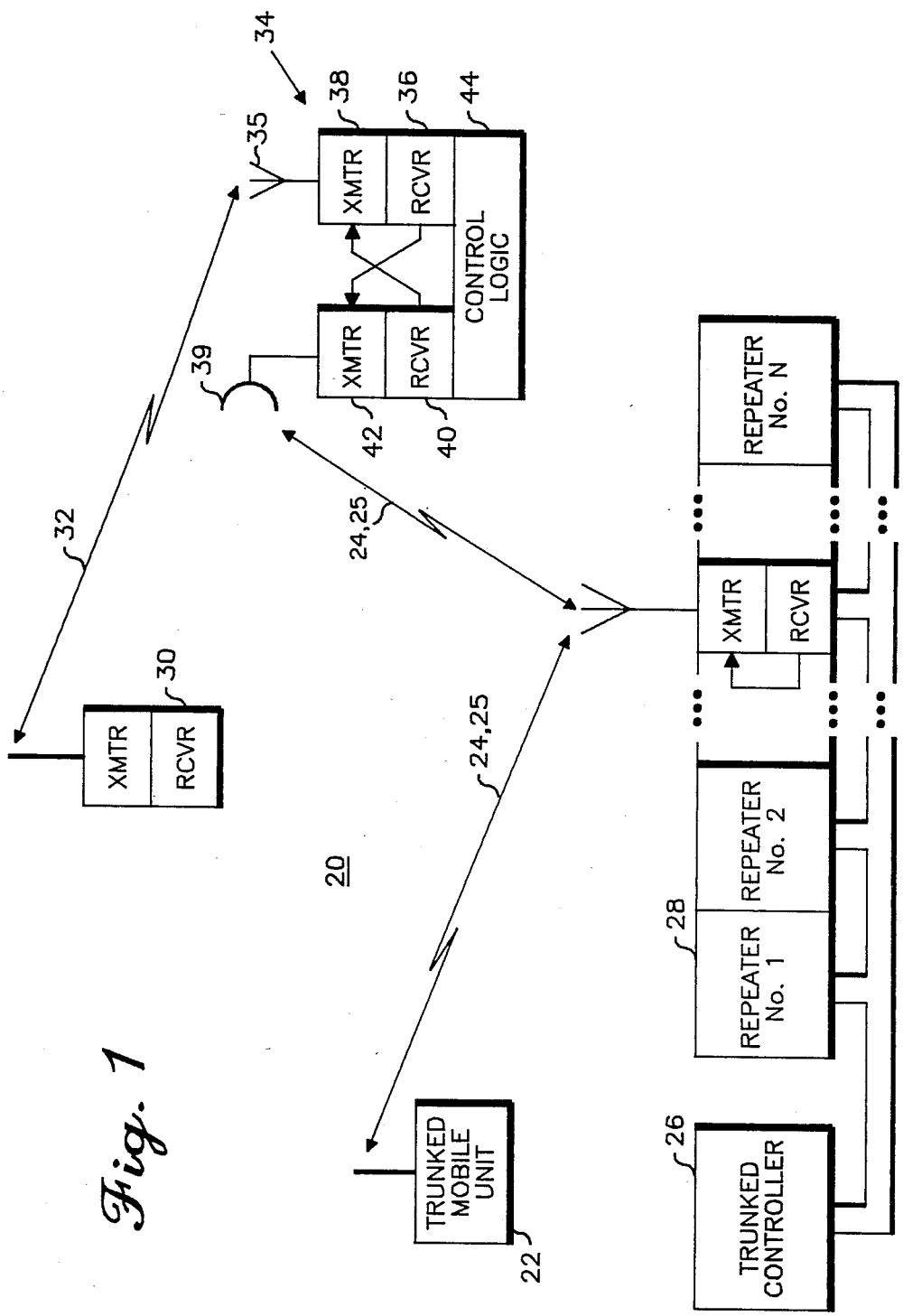
FIG. 1 is a block diagram illustrating the multifrequency trunked, two-way radio communications system according to the invention.

Referring to FIG. 1, there is shown an improved multifrequency trunked, two-way radio communications system according to the invention and designated generally by the reference character 20. A plurality of trunked mobile stations 22 (one shown) share a predetermined number of information channels 24. A trunked controller 26 assigns one of the information channels 24 to a requesting trunked mobile unit 22. A plurality of repeaters 28 shown No. 1 through No. N are provided in conjunction with the trunked controller 26 corresponding to the predetermined number of information channels 24.

One of the information channels 24 is dedicated as a control channel 25 to accommodate signaling between the trunked mobile units 22 and the trunked controller 26.

Control channel 25 is used to carry digital data messages from trunked controller 26 to the trunked mobile stations 22 and likewise from trunked mobile stations 22 to trunked controller 26.

The above-described portion of system 20 illustrates a typical trunked, two-way radio communications system. Either message trunking or transmission trunking can be employed. Before a detailed discription of the improved communications system 20, it may be helpful to first consider the operation of a typical trunked system including trunked mobile stations 22, information channels 24, trunked controller 26 and repeaters 28.

Accordingly attention is directed to FIG. 8, where the operation of the conventional trunked system can be understood with reference to actions numbered 1 through number 7 within the trunked system.

Action 1 represents a call being initiated by a requesting trunked mobile station 22 by engaging a push-to-talk (PTT) switch. Action 2 represents the signaling on the dedicated control channel 25 from the requesting unit 22 to the trunked controller 26. An incoming signaling word (ISW) is received by the trunked controller 26. The request ISW includes the unique identification code signal of the requesting station 22 and any special functions, such as for selectively calling a desired fleet of stations 22 without alerting other stations 22.

The signalling will not be described herein in detail; however, a digital encoded-decoder and method of signaling that is particularly useful in a trunked communications system is described in U.S. Pat. No. 4,312,070 issued Jan. 19, 1982 to Coombes et al., which is assigned to the same assignee as the present invention. Such method and apparatus could advantageously be arranged to perform the signaling functions which are described herein.

Action 3 illustrates the operation of the transmitter of the requesting trunked unit 22. The requesting trunked transmitter is first enabled to transmit the ISW requesting a channel assignment on the dedicated control channel 25, corresponding to Action 2.

Action 4 illustrates the trunked controller 26 responding on the dedicated control channel 25 with an outgoing signaling word (OSW) granting the requesting unit 22 a channel assignment of one of the trunked information channels 24. Trunked controller 26 periodically repeats the OSW for the duration of the channel assignment. The grant OSW includes a destination address signal corresponding to the requesting station's identification code signal.

Actions 5 and 6 represent the operation of the transmitter in the assigned repeater 28. Action 5 shows the transmitter in repeater 28 being enabled following the initial grant OSW. Action 6 illustrates the repeater 28 transmitting a high speed connect word followed by a low speed connect word to the requesting mobile 22. Action 7 illustrates the operation of the transmitter in the requesting mobile 22 that is tuned or switched to the assigned one of information channels 24. The requesting mobile 22 acknowledges with the high speed connect tone, and voice communication is enabled.

When the originating unit 22 releases the push-to-talk switch, a disconnect tone is transmitted by the originating mobile 22, shown in Action 7. The assigned trunked repeater 28 transmits a disconnect word after a predetermined time delay following the transmission of the disconnect tone by the originating mobile 22, shown in Action 6. This predetermined time delay is provided to enable any of the receiving mobile stations 22 to respond on the particular assigned channel. The disconnect word transmission by the assigned trunked repeater 28 ends the channel assignment.

The present invention advantageously can be applied to a transmission trunked communication system, such as described in the before mentioned Lynk et al patent. Likewise, the present invention advantageously can be applied to the above-described message trunked communication system and to other trunked systems which may be devised by one skilled in the art without departing from the spirit and scope of the present invention. The improved communications system 20 will be described herein with a message trunking implementation.

Referring again to FIG. 1, the improved multifrequency trunked, two-way radio communication system 20 further includes a plurality of conventional single channel remote stations 30 (one shown). A single channel 32 is shared by the plurality of conventional remote radio stations 30. Channel 32 has a frequency separate from those included in the predetermined number of multifrequency channels 24, 25.

A radio access link designated generally by the reference character 34 is provided to enable the plurality of conventional mobile radio stations 30 to operate on the plurality of information channels 24 in the same manner as the trunked mobile stations 22. The radio access link 34 includes a conventional antenna 35, a conventional receiver 36 for receiving transmission on channel 32, a conventional transmitter 38 for transmitting on channel 32, a trunked antenna 39, a trunked receiver 40 for receiving on an assigned one of channels 24 and control channel 25, a trunked transmitter 42 for transmitting on an assigned one of channels 24 and control channel 25, and control logic 44.

Briefly, the operation of conventional two-way radio units 30 within the trunked system may be understood as follows:

The sequence starts with a conventional remote station 30 wishing to communicate with preselected ones of the trunked remote stations 22, which may be effected according to a destination address program stored in control logic 44. Conventional remote station 30 initiates the call by engaging a PTT switch and transmitting a signal. The signal is received at antenna 35 and is coupled to conventional receiver 36 of the radio access link 34. Control logic 44 generates a request for channel assignment that is transmitted by the trunked transmitter 42 to the trunked controller 26. The trunked controller 26 assigns one of the available information channels 24 and transmits a grant OSW on the dedicated control channel 25 via one of the repeaters 28. Antenna 39 receives the grant OSW signal and couples the same to trunked receiver 40 and control logic 44. Control logic 44 provides a signal to trunked transmitter 42 to enable transmitting on the channel assigned by trunked controller 26. Control logic 44 generates an information tone signal that is transmitted by conventional transmitter 38 to notify the requesting conventional remote station 30 that transmission may proceed. Thus, a transmission from conventional station 30 to the trunked mobile stations 22 is enabled.

When a requesting trunked station 22 initiates a call to all of the conventional stations 30, trunked controller 26 responds with a channel assignment grant OSW signal that includes the identification code signal of the radio access link 34. The control logic 44 provides a signal to the trunked receiver 40 to enable receiving on the channel assigned by trunked controller 26. The conventional transmitter 38 is enabled by a control signal generated by control logic 44, and voice communication is enabled. The transmission from the requesting trunked mobile 22 is coupled through antenna 39 and received on the assigned channel 24 by the link trunked receiver 40. The output of receiver 40 is coupled to conventional transmitter 38 and transmitted thereby to the conventional stations 30 on the separate single channel 32.

Figure 2:
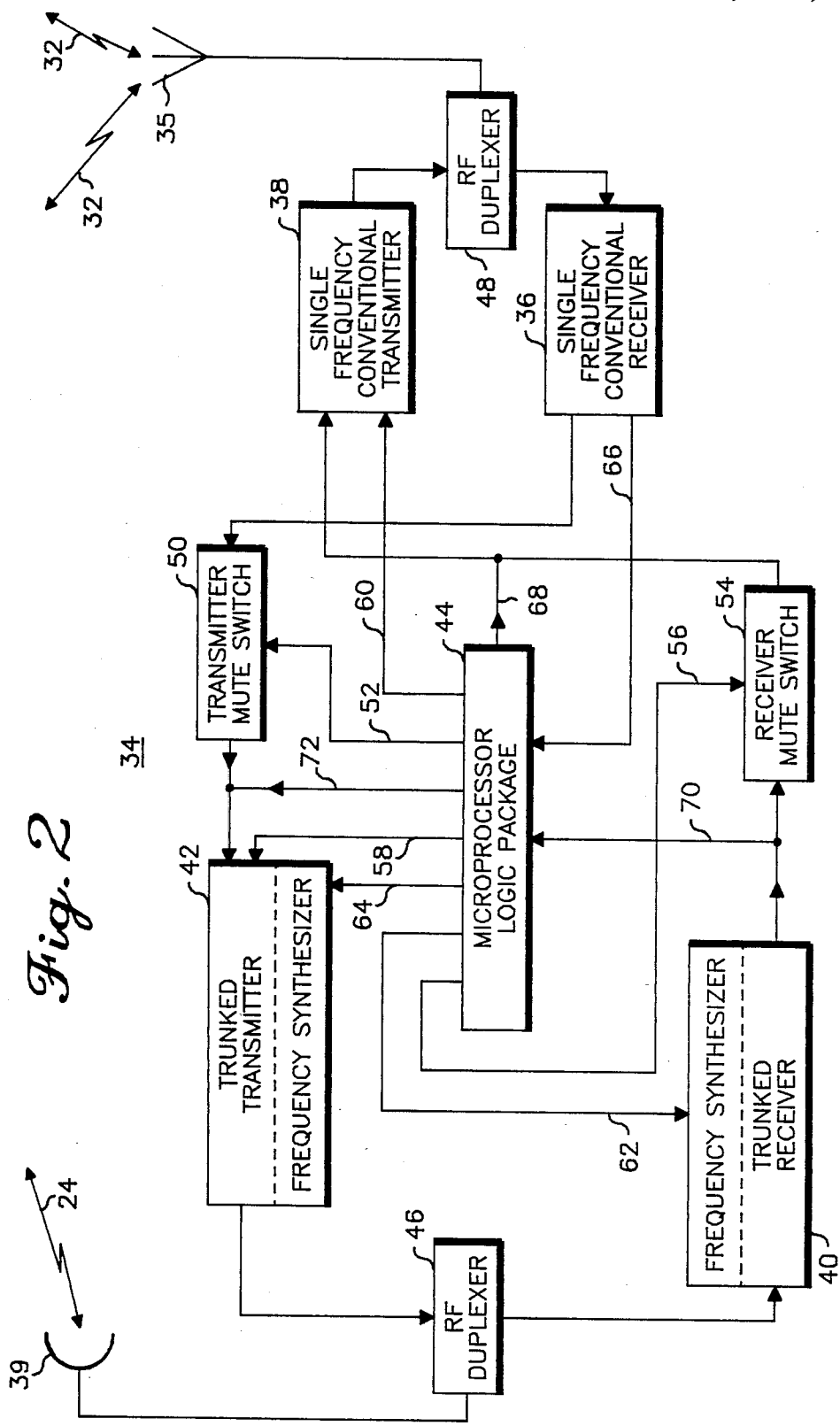
FIG. 2 is a block diagram illustrating the radio access link of FIG. 1 according to the invention.

Referring now to FIG. 2, there is shown a block diagram illustrating the radio access link 34 of FIG. 1. Identical numbers have been used to indicate the same components.

A microprocessor control unit 44 is shown as an illustration of how the radio access link 34 can be implemented in the improved communications system 20, and the operational steps embodied in the software are illustrated in the flowcharts 3, 4a, 4b, 5a, 5b, 6a, 6b, 6c, 6d and 7. Alternately, the radio access link 34 can be implemented by a hardware implementation including digital logic circuits which could be embodied in commercially-available integrated circuits.

The radio access link 34 includes RF duplexers 46, 48 to enable two-way, duplex operation. A transmitter mute switch 50 is provided to mute the trunked transmitter 42 and thereby mute the audio received path from the conventional receiver 36. The microprocessor control logic 44 provides control signals 52 to open and close transmitter mute switch 50.

A receiver mute switch 54 is provided to mute trunked receiver 40 and thereby mute the transmit path to the conventional transmitter 38. Control signals 56 are provided by the microprocessor control logic 44 to open and close the receiver mute switch 54.

Microprocessor control logic 44 provides transmitter turn-on (TTO) signals 58, 60 to enable and disable the trunked transmitter 42 and the single frequency, conventional transmitter 38, respectively. The microprocessor control logic 44 further provides frequency synthesizer programming and control signals 62, 64 to the trunked receiver 40 and trunked transmitter 42, respectively, to enable receiving and transmitting on any assigned information channel 24 and dedicated signalling channel 25.

Antenna 35 receives the radiated RF signal of the conventional channel 32 and couples the same via RF duplexer 48 to the single frequency, conventional receiver 36. Conventional receiver 36 provides a carrier detect output signal 66 that is coupled to the microprocessor control logic 44. The microprocessor control logic 44 then provides appropriate informational signals 68 that are transmitted to the conventional, single channel remote stations (30) by conventional transmitter 38. The information signals 68 include a busy tone, a talk permit tone and a talk prohibit tone. Additional information signals can be provided as desired for the particular communication system.

Antenna 39 is coupled via RF duplexer 46 to the trunked receiver 40 and trunked transmitter 42. A recovered audio output signal 70 of the trunked receiver 40 is coupled to the microprocessor control logic 44. Output signal 70 includes all information signals received from the dedicated control channel 25 and recovered audio from an assigned information channel 24.

The microprocessor control logic provides information signals 72 that are transmitted by the trunked transmitter 42 on the dedicated control channel 25 and any assigned channel 24. Information signals 72 include a request for a channel assignment, a low speed connect tone and disconnect tone.

Figure 3:
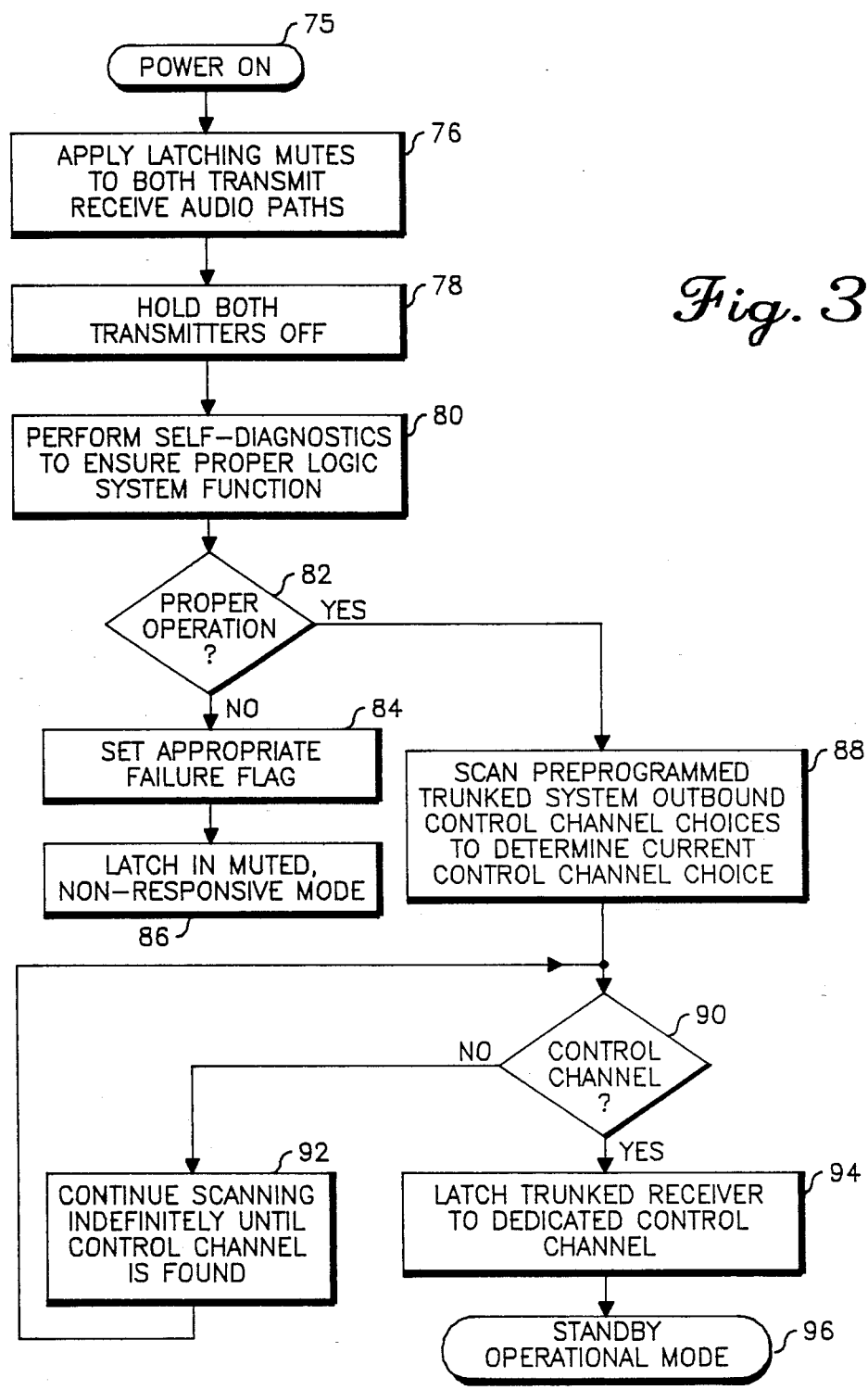
FIG. 3 is a logic flow diagram illustrating power-on initialization of the radio access link.

Referring to FIG. 3, there is shown a logic flow diagram illustrating power-on initialization of the microprocessor control logic 44 of the radio access link 34 shown in FIG. 2.

Following power on shown in block 75, the first microprocessor activity is to apply latching mutes to both transmit and receive audio paths such as indicated in block 76. Control signals (52, 56) are provided to the transmitter mute switch (50) and receiver mute switch (54), respectively, to mute both audio paths. Next, as indicated in block 78, signals are provided (58, 60) to disable both conventional transmitter (38) and trunked transmitter (42). Self-diagnostics (block 80) are then performed on the microprocessor control logic (44) to ensure proper logic system function. A decision is made (block 82) to determine whether or not the microprocessor control logic (44) is operating properly. If the decision is no, an appropriate failure flag is set (block 84). Following that action, signals (52, 56) are supplied to mute switches (50, 54) and signals (58, 60) are supplied to transmitters (38, 42) to latch the radio access link (34) in a muted, non-responsive mode (block 86).

If the decision (at block 82) is that the microprocessor control logic (44) is operating properly, then the operation passes to a block 88. The preprogrammed trunked system outbound control channel choices are scanned to determine the current choice of a dedicated control channel (25), as indicated in block 88.

A decision (block 90) is made to determine whether or not the control channel (25) has been found. If it is determined that the control channel has not been found, then scanning is continued indefinitely until the control channel is found (block 92). Alternatively, if a determination is made that the control channel (25) has been found, then a control signal (62) is provided to the link trunked receiver (40) to enable it to latch onto the dedicated control channel (25), as indicated in block 94. Following the switching or tuning of receiver (40) to control channel (25), the standby or quiescent operational mode begins, as indicated in block 96. In the standby operational mode, the microprocessor control logic (44) monitors the dedicated control channel (25) and reverts to scanning (block 92) if the control channel (25) is lost; and monitors the carrier detect output signal (66) of the conventional receiver (36).

The radio access link (34) has a unique station identification code signal. While monitoring the dedicated control channel (25) in the standby operational mode, any received OSW's are compared to the radio access link identification code signal. If the compared signals do not match, the OSW is ignored. If a match is made, a call from one of the trunked mobile units 22 is indicated as illustrated in the flowcharts of FIGS. 4a and 4b.

Figure 4A:
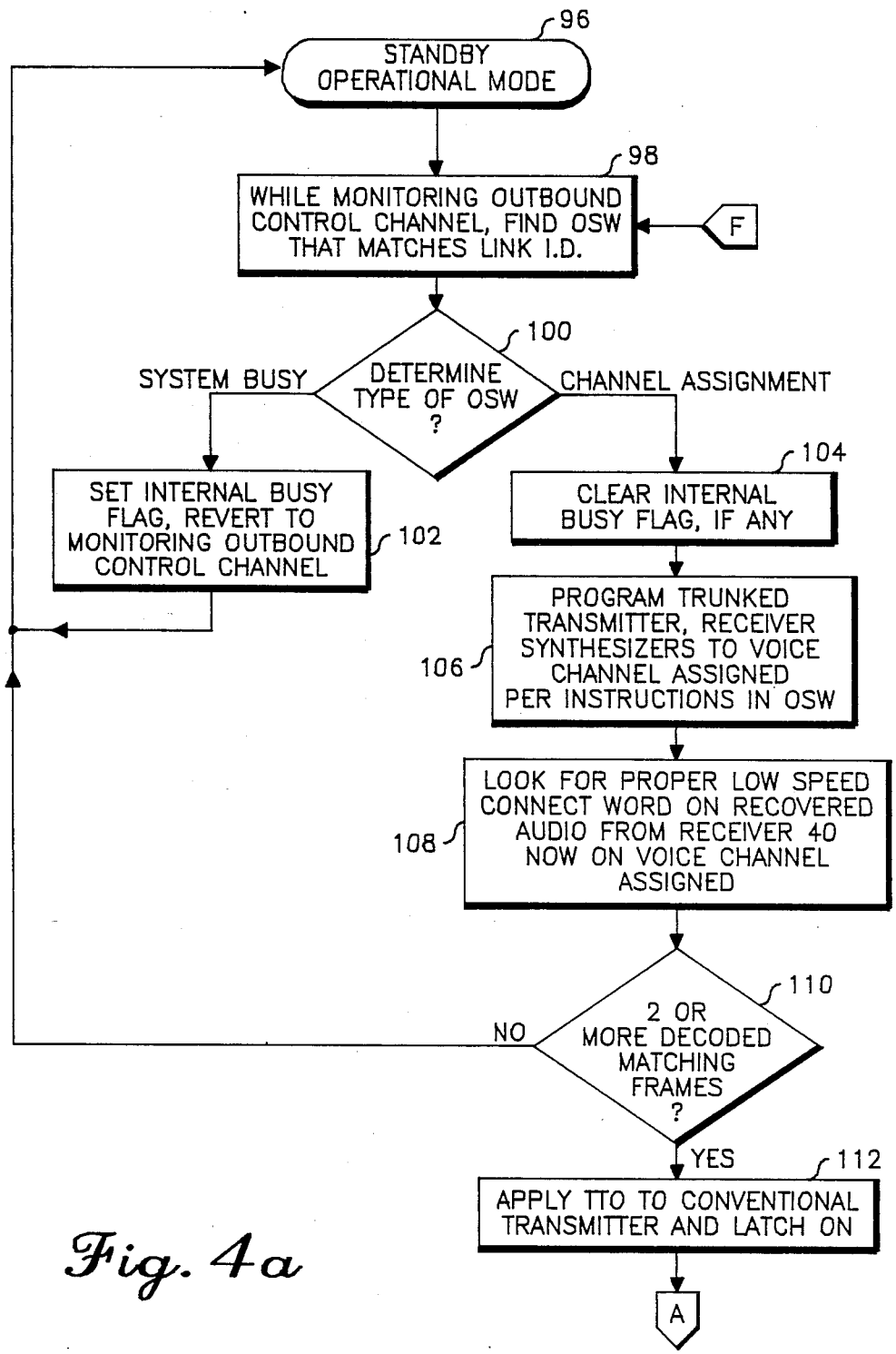
FIGS. 4a and 4b are logic flow diagrams illustrating the operation of the radio access link receiving a call initiated by a trunked station.
Figure 4B:
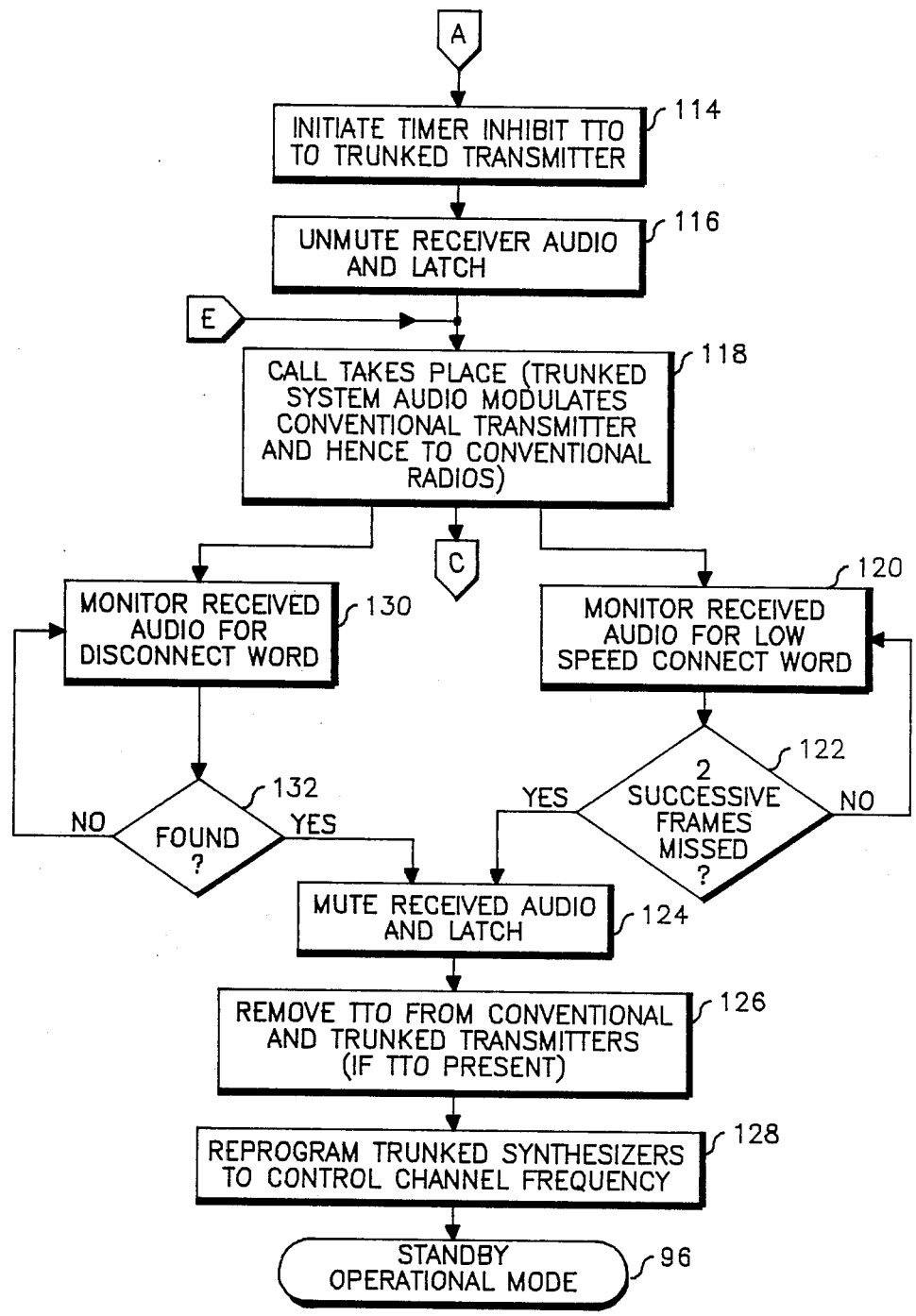

Referring to FIGS. 4a and 4b, there is shown a logic flow diagram illustrating the operation of the microprocessor control logic 44 of the radio access link 34 shown in FIG. 2 with a call initiated by one of the trunked stations 22. Attention is also directed to FIG. 8 which provides an event diagram corresponding to the FIGS. 4a and 4b.

The microprocessor control logic (44) begins in the quiescent or standby operational mode shown in block 96. The dedicated control channel (25) is monitored and the received OSW's are sequentially compared with the identification signal of the radio access link (34) that is stored in the microprocessor control logic (44). When a match is found a decision is made to determine what the OSW indicates, illustrated at block 100. If it is determined that the OSW indicates a system busy, an internal busy flag is set (block 102), and the control logic (44) reverts back to the standby operational mode shown in block 96.

When a determination (block 100) is made that the OSW indicates a channel assignment, any internal busy flag is cleared, as shown in block 104. Following that action, frequency synthesizer programming and control signals 62, 64 are provided to the trunked receiver 40 and trunked transmitter 42, respectively, shown in FIG. 2, and as indicated at block 106. This operation is illustrated in Action 9 of FIG. 8. The link trunked receiver 40 and link trunked transmitter 42 are tuned or alternately switched to the assigned information channel 24 responsive to the control signals 62, 64.

The next operation is monitoring the recovered audio signal 70 from the link trunked receiver 40 (shown in block 108) for a proper low speed connect word, such as 150 baud subaudible data continuously repeating an identification (ID) signal. The recovered audio signal 70 is illustrated in Action 8 of FIG. 8. A decision (block 110) is made to determine whether or not two or more decoded frames provide a match in a four-frame period. If less than two decoded frames match the link ID signal, then the microprocessor control logic (44) is returned to the quiescent state shown in block 96.

When two or more decoded frames match, transmitter turn-on signal (60) is provided to enable and latch the conventional transmitter 38 on, as indicated in block 112.

Actions 10 and 12 of FIG. 8 illustrate the operation of the link conventional transmitter 38. Action 13 illustrates the operation within the conventional stations 30, and the carrier detect output signal from the receivers of conventional stations 30.

Referring to FIG. 4b, following turn-on of transmitter (38), a timer is initiated that inhibits a TTO enable signal (58) to the link trunked transmitter (42) for a predetermined time set by this timer, as shown in block 114. For example, the timer can inhibit an enable TTO signal (58) for two seconds. This inhibit timer is employed to provide the originating unit (22) the minimum predetermined time to talk without interruption. Next, as indicated in block 116, a control signal (56) is supplied to unmute and latch receiver mute switch (54) to provide a received audio path from the trunked receiver (40). This operation is illustrated in Action 11 of FIG. 8. Thereafter, the call is enabled, as indicated in block 118.

This operation of the call may be understood with reference to FIG. 2 as follows: The link, trunked receiver 40 receives via the RF duplexer 46, the audio on the assigned one of information channels 24 from the originating remote trunked station 22. The recovered audio output 70 of receiver 40 is coupled through receiver mute switch 54 to the conventional transmitter 38. The transmitter 38 transmits the audio to the conventional remote stations 30 channel 32. Action 12 of FIG. 8 illustrates the audio transmission to the conventional stations 30, and Action 14 illustrates the audio reception by the same. The trunked controller 26 generates a disconnect word on the conclusion of the channel assignment. The assigned trunked repeater 28 sequentially transmits the high speed connect word, the low speed connect word and the disconnect word which are received by the link trunked receiver 40, illustrated in Action 6 of FIG. 8.

The received audio signal (70) is monitored for the presence of the low speed connect word, as indicated in block 120 of FIG. 4b. A decision is made (block 122) to determine whether or not the low speed connect word is absent for two successive frames. If it is not, monitoring of the received audio (70) for the presence of the low speed connect is continued. When (block 122) determined that the low speed connect word is absent for two successive frames, then operation is passed to block 124.

A control signal (56) is provided to latch the receiver mute switch (54) open, so that the received audio path is muted (block 124). Next, the TTO enable signal (60) is removed from the conventional transmitter (38) and the TTO enable signal (58) also is removed from the trunked transmitter 42, if present, as shown in a block 126. Synthesizer programming and control signals (62, 64) are provided to the link, trunked receiver (40) and trunked transmitter (42) to move the receiver (40) and transmitter (42) to the dedicated control channel (25), as illustrated in a block 128. Following this operation, the microprocessor control logic (44) returns to the standby operational mode shown in the block 96.

The received audio signal (70) is monitored for a disconnect word, as indicated in block 130. A decision is made to determine whether or not a disconnect word has been found, as indicated in a decision block 132. If a disconnect word is not found, monitoring of the received audio signal (70) is continued. When it is determined that a disconnect word has been received, operation is passed to block 124. The microprocessor reverts back to the standby operational mode 96 in the same manner as hereinbefore described after (decision block 122) detecting the absence of the low speed connect word for two successive frames.

Figure 5A:
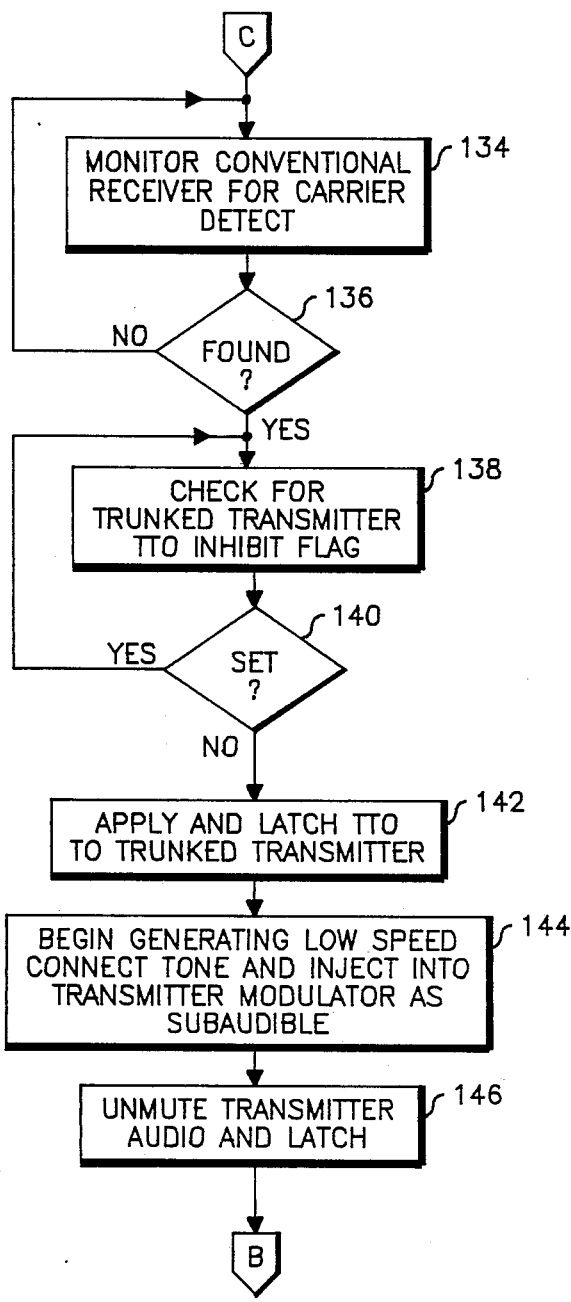
FIGS. 5a and 5b are logic flow diagrams illustrating the operation of the radio access link receiving a call initiated by a conventional, non-trunked, station with a voice channel previously assigned.
Figure 5B:
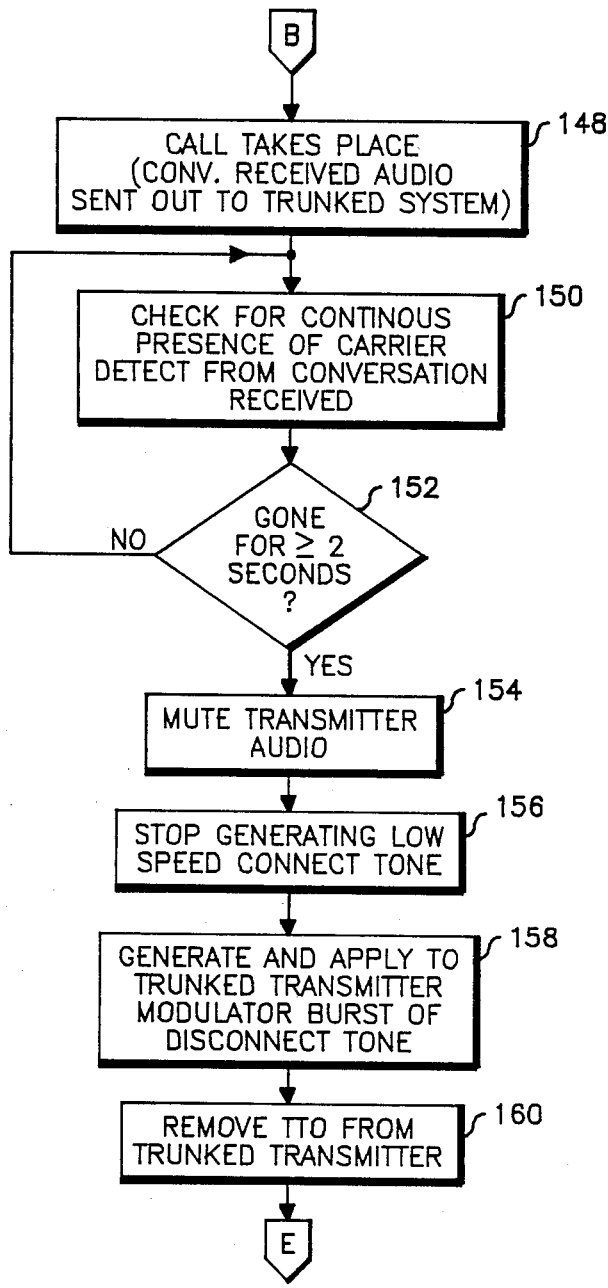

Referring now to FIGS. 5a and 5b, there is shown a logic flow diagram illustrating the operation of the microprocessor control logic 44 with a call initiated by a conventional remote station 30 with a voice channel 24 already assigned, as for example, a channel assignment already effected by a trunked station 22 transmitting to the conventional radios 30 through the radio access link 34 shown at block 118 of FIG. 4b. Referring also to FIG. 9, there is shown an event diagram corresponding to the operation illustrated in FIGS. 5a and 5b.

The initial operation shown in FIG. 5a is monitoring the signal (66) from the single frequency, conventional receiver (36), as indicated in a block 134. This operation follows audio transmission from a trunked station (22), indicated in block 118 of FIG. 4b. A continuous tone control squelch system (CTCSS) optionally can be employed in the conventional remote stations (30) and correspondingly in the radio access link (34). Briefly, in a continuous tone control squelch system a subaudible tone, usually between 67 and 200 Hz is broadcast with the audible information. Each transceiver has frequency selective circuitry responsive to a particular tone in this range. The active state of carrier detect output signal (66) corresponds to a subaudible tone being received by link, conventional receiver 38.

A decision (block 136) is made to determine whether or not a carrier detect output signal (66) is found that corresponds to a request to talk by one of the conventional stations 30. Action 1 of FIG. 9 illustrates the operation of a push-to-talk PTT switch by the requesting conventional station 30. When (block 136) determined that a request to talk has been received, operation is passed to a block 138. The next operation, as indicated in block 138, is checking for a TTO inhibit flag to the link trunked transmitter (42) effected by the prior operation shown in block 114 of FIG. 4b. Next it is determined whether or not the TTO inhibit flag is set, as indicated in a decision block 140. If a determination is made that the TTO inhibit flag is set, the operation is passed back to block 138 and checking for the TTO inhibit flag continues until it is removed.

When (decision block 140) determined that the TTO inhibit flag is not set, a TTO signal (58) is provided to enable and latch the trunked transmitter (42) on, as indicated in a block 142 and in Action 5 of FIG. 9.

The next operation is to begin generating a low speed connect tone and trunked transmitter (42) transmits the subaudible low speed connect tone, as indicated in a block 144. This operation is illustrated in Action 7 of FIG. 9.

Following block 144, a block 146 illustrates the next operation of providing a signal (52) to the transmitter mute switch (50) to unmute the transmit path to the trunked stations (22); and illustrated in Action 6 of FIG. 9.

Referring to FIG. 5b, the next operation (call takes place) is indicated in a block 148. Audio from the conventional station (30) is received at antenna (35) and coupled through RF duplexer (48) to the conventional receiver (36). The audio output of conventional receiver (36) is coupled through the transmitter mute switch (50) to the trunked transmitter (42) and transmitted to the trunked stations (22) and illustrated in Action 3, 7, 9 and 10. Actions 2 and 3 illustrate the operation of the transmitter of conventional remote station (30).

Following the audio transmission by conventional station 30, monitoring the carrier detect output signals (66) from the conventional receiver (36) continues as indicated in a block 150. A decision is made, as indicated in a decision block 152, to determine whether or not the carrier detect output signal (66) has been absent for a predetermined period of time, for example, two seconds. The carrier detect output signal is illustrated in Action 4 of FIG. 9.

When a determination is made (block 152) that the carrier detect output signal (66) has been absent for more than the predetermined period of time, operation is passed to a block 154. A signal (52) is supplied the transmitter mute switch (50) to mute the audio transmit path (block 154) to the trunked stations (22). Then the generation of the low speed connect tone is inhibited, as shown in a block 150. Next a burst of disconnect tone is generated and applied to the trunked transmitter (42), illustrated in a block 158 and Action 7 of FIG. 9. Then TTO signal (58) is removed to disable the trunked transmitter (42) shown in a block 160. Operation is passed back to block 118 shown in FIG. 4b, so that the trunked station (22) is enabled to respond.

Referring to FIGS. 6a, 6b, 6c and 6d, there is shown a logic flow diagram illustrating the operation of the microprocessor control logic 44 of the radio access link 34 shown in FIG. 2 with a call initiated by one of the conventional stations 30 without an information channel 24 previously assigned. Referring also to FIGS. 10a and 10b, there is shown a corresponding event diagram.

The microprocessor control logic (44) begins in the quiescent or standby operational mode shown in block 96. The carrier detect output signal (66) of the conventional receiver (36) is monitored and is continuously checked for a carrier detect signal indicating a request to talk from one of the conventional radio stations (30), as indicated in a block 162. Action 2 of FIGS. 10a illustrates the operation of the PTT switch by a requesting conventional station (30). A decision is made, as illustrated in a decision block 164, to determine whether or not a carrier detect signal (66) is present corresponding to a request to talk from one of the conventional remote stations (30). If it is determined that such a carrier detect signal is not present, checking of the carrier detect signal continues (block 162).

When a determination is made that the carrier detect output signal (66) that is illustrated in Action 5 of FIG. 10a, corresponds to a request to talk by one of the conventional remote stations (30), operation is passed to a decision block 166. A determination is made whether or not the trunked receiver (40) is receiving from the dedicated control channel (25) and that a frame synchronization signal (70) is detected. If it is determined that a frame synchronization signal is not detected, a TTO signal (60) is provided to enable conventional transmitter 38 for a predetermined period of time, for example, three seconds, and simultaneously applies a talk prohibit signal (68) to the modulation input of conventional transmitter (38), as shown in a block 168. The talk prohibit tone indicates that it will be necessary to wait and later initiate a new request to talk. The next operation is setting a flag to ignore the carrier detect output signal (66) until an interruption of a minimum period of time is detected, for example, five seconds, as shown in a block 170.

If determined that the frame synchronization signal (70) is detected (block 166), a decision is made to determine whether or not an internal busy flag is set, as indicated in a decision block 172.

When determined that an internal busy flag has been set, a busy tone is generated and a TTO signal (60) is provided to enable the conventional transmitter 38 to transmit the busy tone information signal (68), as shown in a block 173. Thus, the conventional remote stations (30) are notified of the system busy condition. Again a flag is set to ignore the presence of the carrier detect output signal (66) until an interruption of a minimum period of time is detected, as shown in block 170. Next the sequential operation of the microprocessor control logic (44) is resumed, as indicated in block 162.

When a determination is made (block 172) that an internal busy flag is not set, a TTO signal (58) is provided to enable and latch trunked transmitter (42) on, as indicated in block 174. Next an ISW request signal (72) is generated and applied to the trunked transmitter (42), as shown in a block 176. Thereafter, a signal (58) is supplied to disable the trunked transmitter (42) following the transmission of the request ISW. The operation of trunked transmitter (42) is illustrated in Actions 6 and 7 of FIG. 10a. The ISW is illustrated in Action 14 of FIG. 10b within the trunked system.

Figure 6A:
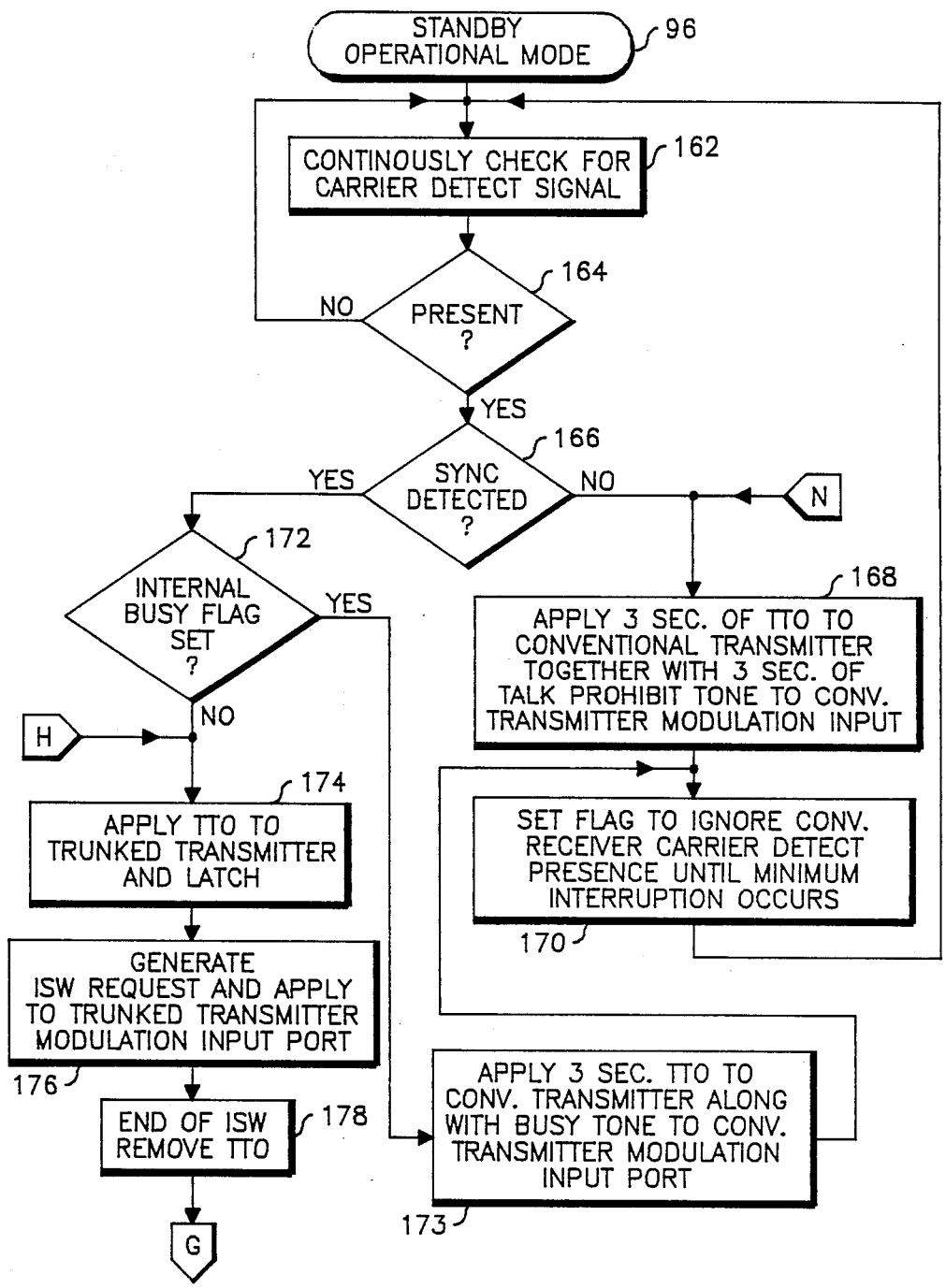
FIGS. 6a, 6b, 6c and 6d are logic flow diagrams illustrating the operation of the radio access link receiving a call initiated by the conventional station without a prior assigned voice channel.
Figure 6B:
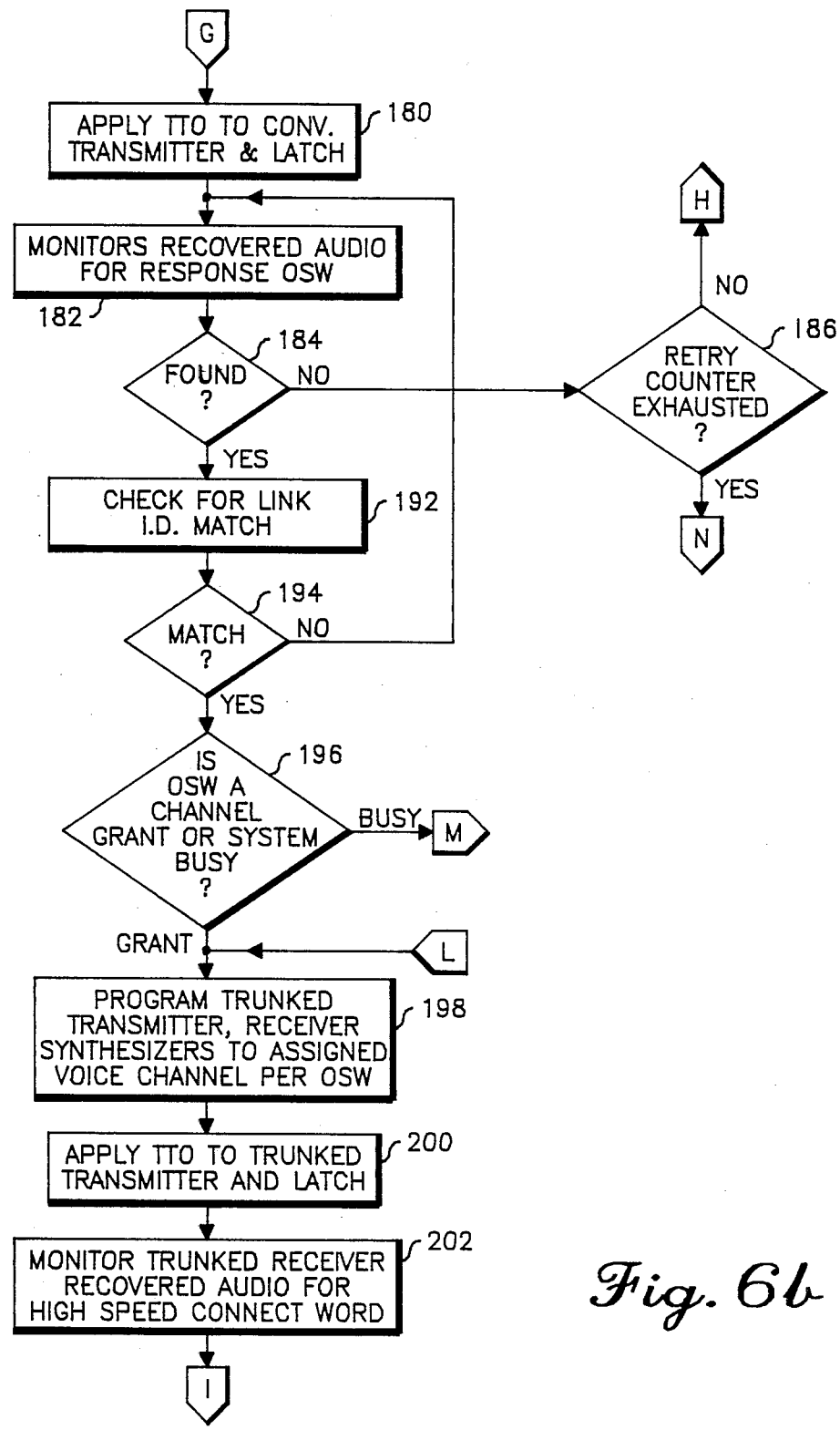

Referring to FIG. 6b, a block 180 illustrates the next operation of applying a TTO signal (60) to enable and latch the conventional transmitter (38) on. This operation is illustrated in Action 8 of FIG. 10a. The recovered audio signal (70) is monitored for a response OSW, as indicated in a block 182. A decision is made, indicated in a decision block 184, to determine whether or not a response OSW has been received. If a determination is made at block 184 that a response OSW has not been found, operation is passed to a decision block 186.

A decision is made to determine whether or not an automatic request re-try counter has been exhausted, as indicated in decision block 186. If it is determined (block 186) that the re-try counter is not exhausted, operation reverts back to that operation indicated in block 174 shown in FIG. 6a, whereby the requesting process is resumed.

When a determination is made that the request re-try counter has been exhausted (block 186), operation is passed back to that operation shown in block 168 in FIG. 6a. The request is terminated as described hereinbefore, and the microprocessor control logic (44) reverts back to the standby operational mode shown in block 96.

When a response OSW is found in the recovered audio signal (70) (block 184), operation is passed to a block 192. The response OSW is illustrated in Action 15 of FIG. 10b. The response OSW signal is compared with the link identification signal, as indicated in block 192. A decision is made, as indicated in a decision block 194, to determine whether the response OSW matches the link identification signal. If the compared signals do not match, the OSW is ignored and the operation reverts to continue monitoring of the recovered audio signal for a response OSW, as indicated in block 182. If a match is made, the next operation, as indicated in a decision block 196, is to determine the type of the response OSW. The recovered audio signal (70) is illustrated at Action 9 of FIG. 10a.

Figure 7:
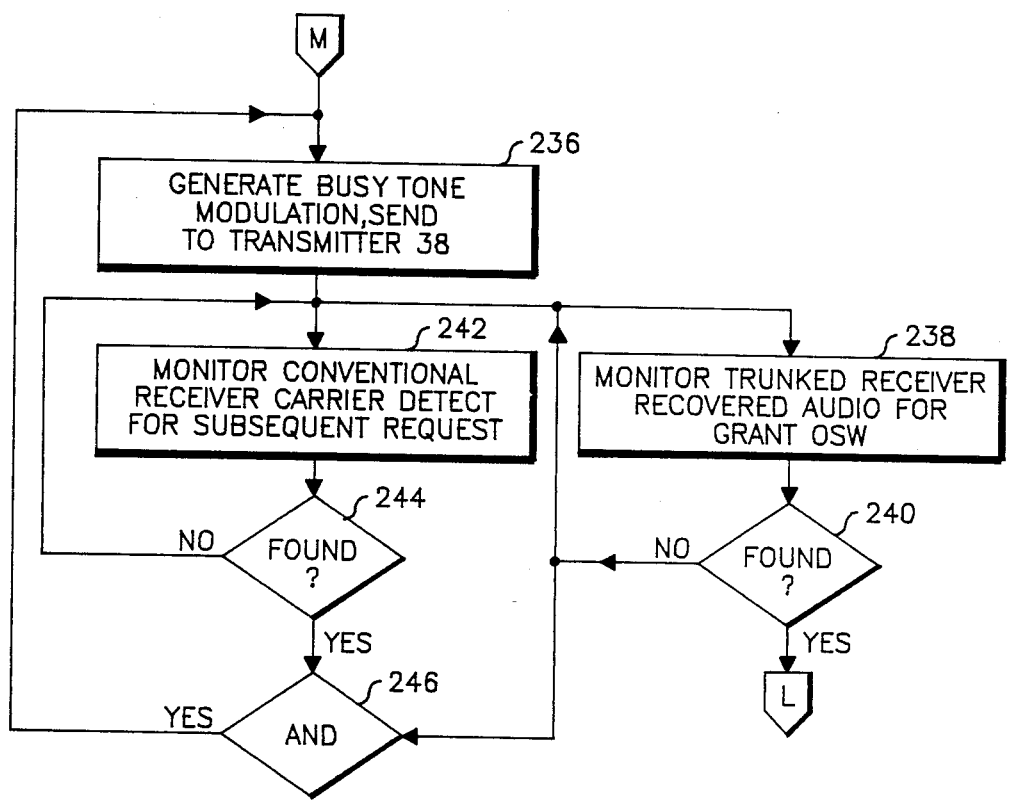
FIG. 7 is a logic flow diagram illustrating the operation of the radio access link receiving a call initiated by the conventional station with all of the voice channels in use for a busy system condition.

If it is determined (block 196) that the OSW indicates a system busy, the microprocessor control logic (44) goes through a system busy routine illustrated in FIG. 7 and FIG. 11. The system busy routine will be described hereinafter with reference to FIGS. 7 and 11. In FIGS. 10a, 10b and 11, the system busy condition is illustrated between time $T_y$ and time $T_z$ and is expanded in FIG. 11 to show details of busy operation.

When a determination is made (block 196) that the OSW indicates a channel assignment grant, the next operation is to provide frequency synthesizer programming and control signals (62, 64) to the trunked receiver (40) and trunked transmitter (42), respectively, as indicated in a block 198. Trunked transmitter (40) and trunked receiver (42) are tuned or switched to the assigned information channel (24) responsive to the control signal (62, 64). This operation is illustrated at Action 10 of FIG. 10a.

Figure 6C:
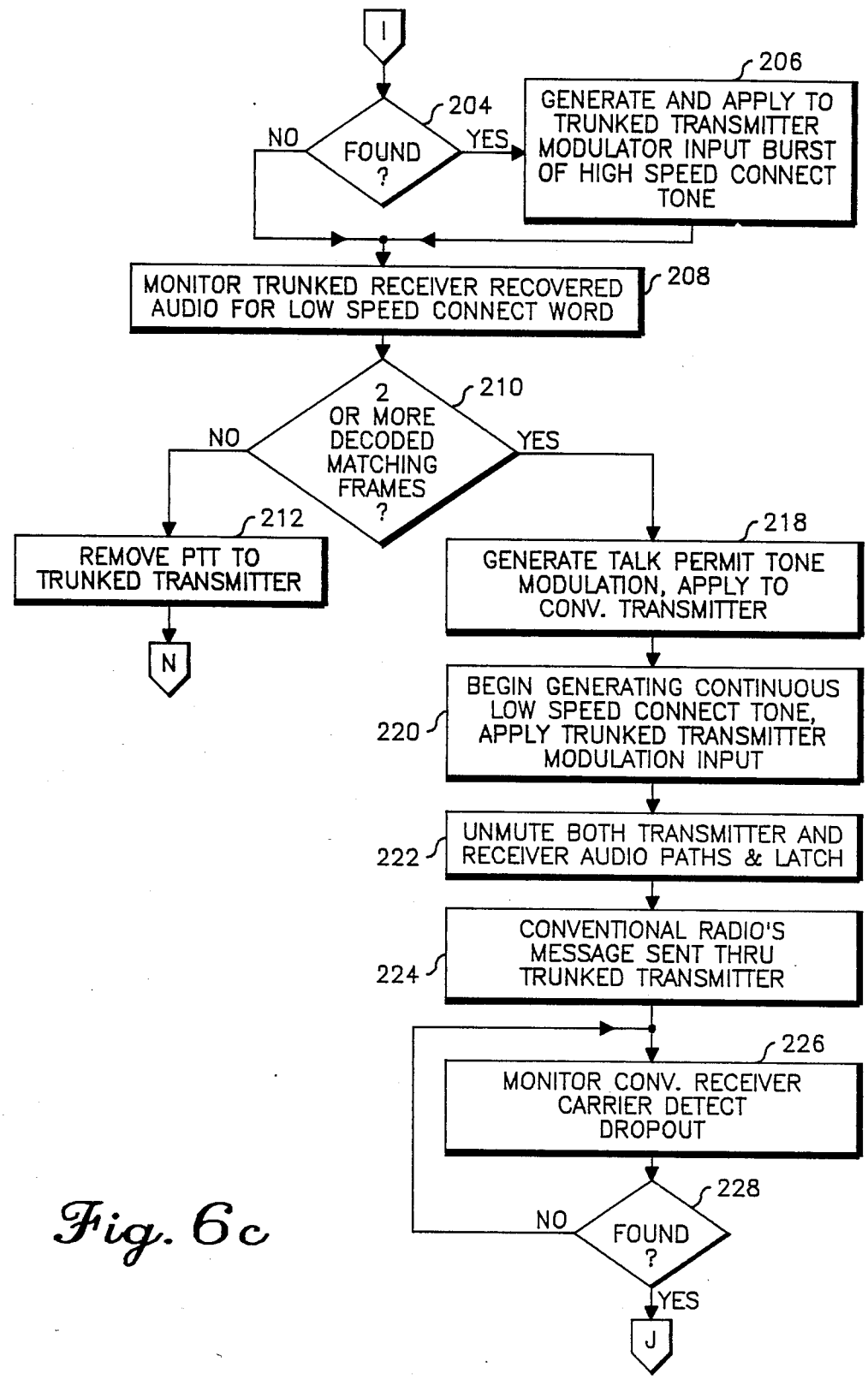
Figure 6D:
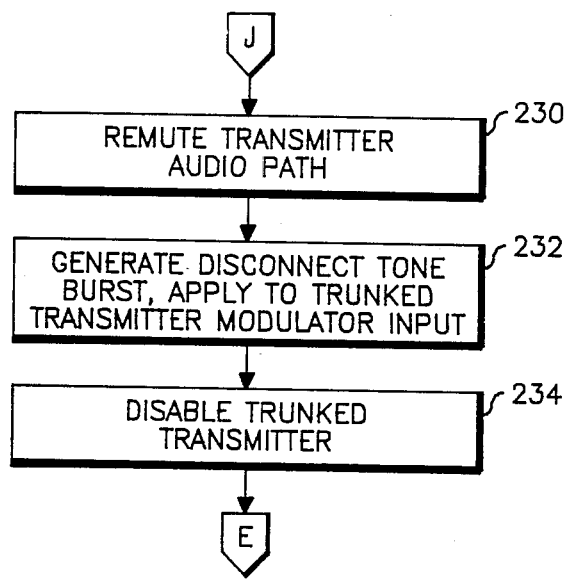

The next operation is to provide the transmission turn-on signal (58) to enable and latch the trunked transmitter (42) on, as shown in a block 200. Following that operation, as indicated in a block 202, the recovered audio signal (70) from the link, trunked receiver (40) is monitored for a high-speed connect word. The high-speed connect word is illustrated in Action 9 of FIG. 10a. Referring to FIG. 6c, as indicated in a decision block 204, a decision is made to determine whether or not a high-speed connect word has been received in the recovered audio signal (70).

If a high-speed connect word is found (block 204), a high-speed connect tone (72) is generated and is transmitted by the trunked transmitter (42) on the assigned voice channel (24), as shown in a block 206, and is illustrated in Action 7. Operation passes to monitoring the recovered audio output signal (70) of the trunked receiver (40) for a low-speed connect word, as shown in a block 208.

If a high-speed connect word is not found (decision block 204), operation passes to monitoring the recovered audio output signal (70) of trunked receiver (40) for a low-speed connect word, (block 208).

Next it is determined whether or not two or more decoded frames provide a match the link identification signal in a four-frame period, as indicated in a decision block 210. If less than two decoded frames match the link ID signal, then signal (58) is provided to disable or turn off trunked transmitter (42), as indicated in a block 212. Operation is passed back to that operation shown in block 168 in FIG. 6a. The request is terminated as described hereinbefore, and the microprocessor control logic (44) reverts back to the standby operation mode shown in block 96 of FIG. 6a.

When two or more decoded frames match the link ID signal, as indicated in a block 218, a talk-permit tone (68) is generated and is applied to the conventional transmitter (38) and transmitted thereby to the conventional stations (30). The talk-permit tone (68) is illustrated in Action 1 and 11 of FIG. 10a. Next, a continuous low-speed connect tone (72) is generated and is applied to the trunked transmitter (42), as indicated in a block 220 and illustrated in Action 7 of FIG. 10a.

Next signals (52, 56) are supplied the transmitter mute switch (50) and receiver mute switch (54), respectively, to unmute both transmit and receive audio paths, as indicated in a block 222 and illustrated in Actions 12 and 13 of FIG. 10a. Next the call from the conventional remote station 30 to the trunked mobile stations 22 is enabled, as indicated in a block 224. This operation is illustrated in Actions 4, 7, 9 and 11 of FIG. 10a and in Actions 17 and 18 of FIG. 10b.

The carrier detect output signal (66) of conventional receiver (36) is monitored to detect the end of transmission, as indicated in a block 226. A decision is made to determine when the carrier detect output signal (60) has been absent for a predetermined period of time, for example, two seconds. If the carrier detect output signal (66) has not been absent for the predetermined period of time, monitoring of the carrier detect output signal (66) is continued (block 226).

Referring to 6d, when it is determined that the carrier detect output (66) has been absent for the predetermined period of time, the control signal (52) is supplied the transmitter mute switch (50) to mute the transmit path to the trunked stations 22, as shown, in a block 230, and illustrated in Action 12. Next, as shown in a block 232, a disconnect tone burst (72) is generated and applied to the trunked transmitter (42), (Action 7). Following a signal (58) is provided to disable the trunked transmitter (42), as shown in a block 234 and Action 6. Next the trunked station (22) is enabled to respond to the conventional stations (30), as indicated in block 118 shown in FIG. 4b.

Referring now to FIG. 7, there is shown a logic flow diagram illustrating the operation of the microprocessor control logic 44 of the radio access link 34 shown in FIG. 2 with all the information channels assigned prior to the request for a channel assignment. Attention is directed to FIG. 11 where an event diagram is provided corresponding to the system busy operation illustrated in FIG. 7.

When it is determined (block 196 shown in FIG. 6b) that the received OSW indicates a system busy, operation is passed, as indicated in a block 236. A busy tone signal (68) is generated and is applied to the conventional transmitter (38) and transmitted to the conventional stations (30), illustrated in Action 1 of FIG. 11.

The recovered audio output signal (70) of trunked receiver 40 is monitored for a grant OSW as indicated in a block 238 and illustrated in Action 3 of FIG. 11. A decision is made, as indicated in a decision block 240, to determine whether or not a grant OSW has been found. If a grant OSW is not found (block 240), the monitoring of the recovered audio output signal (70) is continued. When a grant OSW is found (decision block 240), operation is passed to that shown in block 198 shown in FIG. 6b, and the call is established by the sequential operations described hereinbefore.

The carrier detect output signal (66) of conventional receiver (36) is monitored for a subsequent request to talk by one of conventional stations 30, as indicated in a block 242. A decision is made, as indicated in a decision block 244, to determine whether or not a subsequent request has been received. If a subsequent request is not found, monitoring of the carrier detect output signal (66) is continued (block 242). When a subsequent request has been found (block 244) and a grant OSW has not been found (block 240), a gate 246 passes the operation back as shown in block 236, so that the subsequent requestor is notified of the busy condition.

Action 5 and 6 of FIG. 11 illustrate the operation of central controller 26 placing the radio access link 34 in a queue and granting a channel assignment when an information channel 24 becomes available according to the queue.

In summary, an improved multifrequency trunked, two-way radio communication system has been described wherein a plurality of conventional, single frequency radio units are provided access to the trunked system.

While a preferred embodiment of the invention has been described in detail, it should be understood that many modifications and variations are possible, all of which can fall within the true spirit and scope of the invention.

The before mentioned patents are incorporated herein by reference.

What is claimed is:

1. An improved multifrequency trunked, two-way radio communication system selectively operating on an assigned one of a predetermined number of information channels and wherein in such system one or more non-trunked single fixed channel radio units may be provided access to the trunked system, comprising:
   a trunked controller;
   a plurality of trunked remote stations having means to request a channel assignment from said trunked controller and means responsive to an assigned channel signal to operate on said channel;
   said trunked controller having means to assign a channel to a requesting trunked remote station and means for truncating said remote station channel assignment;
   a plurality of non-trunked remote stations operating on a separate single channel; and
   a radio access link having means for receiving transmissions on said separate single channel from any of said non-trunked remote stations and means to request a channel assignment from said trunked controller in response thereto, and in response to a received assigned channel signal from said trunked controller to permit said plurality of non-trunked remote stations to operate on said assigned channel in the same manner as said plurality of trunked remote stations.

2. An improved multifrequency trunked, two-way radio communication system according to claim 1 wherein each of said trunked remote stations and said radio access link has a unique identification code signal.

3. An improved multifrequency trunked, two-way radio communication system according to claim 1 wherein said trunked remote stations further comprise means for transmitting information signals, said information signals including a destination address identification code.

4. An improved multifrequency trunked, two-way radio communication system according to claim 1 wherein said radio access link further comprises means for transmitting information signals to said plurality of trunked remote stations.

5. An improved multifrequency trunked, two-way communication system according to claim 1 wherein said radio access link requesting and permitting means further detects an identification signal from said requesting trunked remote station, compares said received identification signal with a radio access link identification code signal and ignores said requesting trunked remote station when said compared signals do not match.

6. An improved multifrequency trunked, two-way communication system according to claim 5 wherein said requesting and permitting means further enables operation on the assigned channel when said compared signals match.

7. An improved multifrequency trunked, two-way communication system according to claim 1 wherein said radio access link further comprises means for transmitting information signals to said plurality of non-trunked remote stations, said information signals including an inhibit signal provided in the absence of an assigned channel signal.

8. An improved multifrequency trunked, two-way radio communication system according to claim 1 wherein said radio access link further includes stations include;
   means for transmitting on said assigned channel, means for receiving transmissions on said assigned channel, and means for transmitting on said separate single channel.

9. An improved multifrequency trunked, two-way radio communication system according to claim 8 wherein said radio access link further includes control means for enabling said receiving means and both of said transmitting means.

10. In a multifrequency trunked, two-way radio communications system having a trunked controller and a plurality of trunked remote stations selectively operating in an assigned one of plurality of information channels, a radio access link for providing one or more non-trunked remote stations operating on a separate, single fixed information channel access to the trunked system, said radio access link comprising:

means for receiving transmissions on the separate single channel from any of the one or more non-trunked remote stations and means to request a channel assignment from the trunked controller in response thereto, and in response to a received assigned channel signal from the trunked controller to permit the said one or more non-trunked remote stations to operate on said assigned channel in the same manner as the plurality of trunked remote stations.

11. The radio access link according to claim 10 further comprising means for transmitting information signals to said one or more non-trunked remote stations, said information signals including an inhibit signal provided in the absence of an assigned channel signal.

12. The radio access link according to claim 10 further comprising means for transmitting information signals to said trunked remote stations, said information signals including a destination address identification code.

13. A radio access link according to claim 10 further having a unique identification code signal.

14. The radio access link according to claim 13 wherein said requesting and permitting means detects an information signal, compares said received information signal with said radio access link identification signal and ignores said received transmissions when said compared signals do not match.

15. The radio access link according to claim 10 further including:

means for transmitting on said assigned channel,
means for receiving transmissions on said assigned channel, and
means for transmitting on said separate single channel.

16. The radio access link as claimed in claim 15 further including control means for enabling said said receiving means and both of said transmitting means.

17. A method of providing access for a plurality of non-trunked remote radio stations operating on a single fixed channel to a multifrequency trunked, two-way radio communications system having a trunked controller and a plurality of trunked remote stations operating on an assigned one of a plurality of information channels and permitting operation therewithin, comprising the steps of:

a. receiving a transmission from a non-trunked remote station;
b. requesting a channel assignment from the trunked controller in response thereto;
c. receiving a channel assignment from the trunked controller; and
d. permitting said non-trunked remote station to operate on said assigned channel in the same manner as the trunked remote stations.

18. A method according to claim 17 further comprising the steps of transmitting information signals to the plurality of non-trunked remote stations.

19. A method according to claim 17 further comprising the step of transmitting information signals to the plurality of trunked remote stations.

20. A method according to claim 17 wherein the step of receiving a channel assignment signal from the non-trunked controller includes:

detecting a station identification signal from the non-trunked controller;
comparing said received identification signal with a predetermined identification signal; and
inhibiting further operation when said compared signals do not match.

* * * * *